United States Patent [19]

Rotaru

[11] 3,941,840

[45] Mar. 2, 1976

[54] PROCESS FOR PRODUCING KETOXIMES
[75] Inventor: Cornel Constantin N. Rotaru, Piatra Neamt, Romania
[73] Assignee: Centrala Industriala de Fibre Chimice, Piatra Neamt, Romania
[22] Filed: Sept. 15, 1972
[21] Appl. No.: 289,226

[30] Foreign Application Priority Data
Sept. 24, 1971 Italy................................. 68278/71

[52] U.S. Cl............................. 260/566 A; 423/387
[51] Int. Cl.²........................................ C07C 131/10
[58] Field of Search.................. 260/566 A; 423/387

[56] References Cited
UNITED STATES PATENTS
2,628,889    2/1953    Benson .......................... 423/387 X

*Primary Examiner*—Gerald A. Schwartz
*Attorney, Agent, or Firm*—Karl F. Ross; Herbert Dubno

[57] ABSTRACT

A process for the production of hydroxylamine, by the catalytic reduction of nitrogen monoxide with hydrogen in a mineral acid medium, followed by the reaction of the resulting mixture to produce saturated ketoximes, especially cyclohexanone oxime, by the oximation of the respective ketones with the hydroxylamine contained in the mixture, after adjustment of the pH-value with ammonia.

The new process uses one of two reaction media: (a) ammonium hydrogen sulphate or phosphate; the solution, remaining after the oximation of the ketone and the separation of the ketoxime, is concentrated and evaporated to the dry state; the salt is thermally decomposed and transformed into acid ammonium salt, which is recycled as is the ammonia produced; or (b) pure mineral acid, alone or mixed with pure ammonium salt; the reaction mass, with the separated catalyst is passed over a strongly acid cationite; the released acid is recycled to hydroxylamine synthesis; the hydroxylamine is eluted from the cationite with a more impure mineral acid; or with an acid of medium strength (for instance, acetic acid; the resulting salt is used in oximation, without neutralization), or with various acids, with the production of the corresponding hydroxylammonium salts.

6 Claims, No Drawings

PROCESS FOR PRODUCING KETOXIMES

1. FIELD OF THE INVENTION

The invention relates to a process for the production of hydroxylamine, by the catalytic reduction of nitrogen monoxide with hydrogen in an acid medium, followed by the production of saturated cyclic ketoximes, especially of cyclohexanone oxime, by the oximation of the respective ketones with hydroxylamine, in the form of salt or hydrate, and in the reaction mixture of the first step.

2. BACKGROUND OF THE INVENTION

Hydroxylamine and the saturated cyclic ketoximes, especially cyclohexanone oxime are successive products in the production of lactams, used in the manufacture of polyamidic synthesis fibers.

Hydroxylamine is still produced by noncatalytic small-yield processes, as for instance the Raschig process, obtaining by-products of limited utility. Recently, the more advantageous catalytic processes have been used to an increasing extent. In the majority of these known catalytic processes, hydroxylamine is produced by the hydrogenation of nitrogen monoxide, with hydrogen, in the presence of a strong acid, especially hydrochloric, sulphuric or phosphoric acid, and of a catalyst of the platinum group.

These processes have several disadvantages. Thus, they manifest relatively large consumptions of raw materials such as nitrogen monoxide, hydrogen, and mineral acid. The process yields a mixture of ammonium and hydroxylammonium salts of the acid used; these are employed in the subsequent oximation.

The saturated cyclic ketoximes, especially cyclohexanone oxime, are produced from the above-mentioned mixture of ammonium and hydroxylammonium salt of the above mineral acid, and from the respective ketone, in general by neutralization with ammonia. An aqueous solution of the ammonium salt remains after the separation of the ketoxime; it is concentrated and crystallized; the resulting product may be sold as a fertilizer of limited utility.

In hydroxylamine production by noncatalytic processes, the mixture of ammonium and hydroxylammonium salts, which is used in the oximation process, is more acidic than that resulting from our invention, so that the ammonia consumption in neutralization increases and, consequently the quantity of the recoverable ammonium salt also increases.

3. DESCRIPTION OF THE INVENTION

The present invention relates to a process for hydroxylamine production by the catalytic reduction of nitrogen monoxide with hydrogen in a strong mineral acid medium, followed by the passing of the ammonium and hydroxylammonium salt mixture to the production of saturated cyclic ketoximes, especially of cyclohexanone oxime; the latter step involves the oximation of the respective ketone with the hydroxylamine contained in the mixture, with the concomitant adjustment of the pH-value with ammonia, thereby eliminating the disadvantages of known catalytic processes for the production of hydroxylamine and for the production of the required ketoxime.

According to the invention, in the production of hydroxylamine by the catalytic hydrogenation of nitrogen monoxide with hydrogen, one uses ammonium hydrogen sulphate or, possibly, the phosphate, as reaction medium instead of the respective free acids. The acid sulphate or phosphate are obtained by the thermal decomposition of the respective neutral ammonium salts, resulting from the second stage of ketoxime production or possibly from other sources of neutral salts without impurities which would poison the catalyst.

For the original charge of the free acid used and for the addition of acid for the compensation of losses one may use technical-grade acid, but pure acid is preferred.

Catalytic hydroxylamine synthesis is carried out, preferably, by the continuous contacting of the phases with planetary motion, in a horizontal apparatus provided with satellite shafts, with blades and with planetary mechanisms as mentioned in my U.S. Pat. application Ser. No. 289,223.

The oximation of the saturated cyclic ketones with the ammonium and hydroxylammonium salts mixture can be carried out under conventional working conditions, with the addition of ammonia, in the amount required to achieve the pH-value adopted for the desired degree of oximation.

For the reduction of the solubility of the ketoxime in the water or solvent present during oximation, the mixture of ammonium and of hydroxylammonium salts may receive an addition of neutral ammonium salt.

The ammonium salt remaining after the separation of ketoxime is concentrated and evaporated to the dry state and is further subjected to thermal decomposition for its transformation into the acid ammonium salt; the resulting ammonium salt is recycled to the production of nitrogen monoxide required for the catalytic synthesis of hydroxylamine, by burning with oxygen, or is utilizing in another manner.

The process, according to the invention, leads to a significant increase of hydroxylamine yield to 85–95%, with reference to the quantity of both nitrogen monoxide and hydrogen introduced into the reaction. The increased yield is a result of the reduction in the amount of ammonia formed. Furthermore, productivity is several times higher than in the known catalytic processes due to the intensification of the contacting of the phases present when the reaction is conducted in the horizontal apparatus, provided with planetary agitation. Moreover, the yield and productivity are maintained at the high original level by eliminating the effect of the cumulative poisoning of the catalyst. This is achieved by recycling the mixture of acid ammonium salts resulting from the thermal decomposition of the ammonium salt solution. Consequently, the impurities usually introduced with technical mineral acids are avoided.

It is understood that the recycling of the mixture, the mineral acid and the ammonia are used in a closed circuit, so that the process requires only small addition of these for the compensation of losses. Neutralization, during oximation, is carried out at the current pH of the catalytic processes of hydroxylamine production, with a much smaller consumption than that required in non-catalytic processes. The process permits work with a more active, but less selective catalyst, since the ammonia resulting as by-product in the process is recycled so that its formation in somewhat larger amounts than in current catalytic processes, using mineral acids as reaction medium, results only in a corresponding increase of specific hydrogen consumption.

The effect of cumulative catalyst poisoning — an essential aspect in catalytic processes — may be avoided also by using as reaction medium a pure mineral acid, alone or mixed with its pure ammonium salt, in a closed circuit, without the thermal decomposition of the ammonium salt. In order to do this, the catalyst is separated, while the hydroxylamine formed is separated from the reaction medium by selective retention, on passing over a strongly acidic cation exchanger. The retained hydroxylamine is eluted with a commercial mineral acid, less pure in this case, within the limits allowed by the oximation reaction.

In this elution, it is possible to use an acid of medium strength, for instance, acetic acid, resulting in a hydroxylammonium salt which permits oximation without neutralization and with the release and recycling of the acid used in elution. In this case, by the elution with other acids of the hydroxylamine retained on the ion exchanger, one can obtain a wide range of hydroxylamine salts that can be used for various purposes, as for instance, in reduction processes.

Two examples of the application of the invention are given in the following:

EXAMPLE 1

In a horizontal, cylindrical apparatus for the contacting of phases, provided with a planetary agitator, with a central driving shaft, without blades, and with three satellite shafts, provided with blades, having a capacity of 3 l, is introduced a 1.5 l suspension, containing 500 g ammonium hydrogen sulphate and 5 g of 10% active platinum catalyst on graphite powder. The acid salt results from the thermal dissociation of ammonium sulphate at 320°C.

The air has been evacuated from the apparatus by repeatedly flushing with hydrogen.

In the above apparatus, feeding was started with a mixture of hydrogen and nitrogen monoxide, at a volumetric ratio of 1.5/1. The pressure in the apparatus was maintained at 2 atm-absolute, and the temperature at 18°C, by external cooling by water spraying.

After an operation of 70 minutes, the concentration of hydroxylamine was 66.5 g per liter of filtered solution. The hydroxylamine yield, based on the fed-in nitrogen monoxide, was 87.2%.

1 liter of the solution obtained in the apparatus and filtered was used in the oximation of cyclohexanone, at pH = 2.4 as adjusted by addition of ammonia, and a temperature of 45°C. 219 g cyclohexanone oxime were obtained.

The solution remaining after the separation of cyclohexanone oxime was neutralized with ammonia to pH = 6.5 and evaporated to the dry state. The resulting ammonium sulphate was subsequently subjected to thermal decomposition at about 320°C; 310 g ammonium hydrogen sulphate and 42 g of ammonia were obtained.

In a comparative test, carried out under the same conditions and for the same length of time, but with 1.5 l aqueous solution containing 426 g sulphuric acid, calculated for 100%, only 42 g hydroxylamine per liter were obtained; hydroxylamine yield, based on the nitrogen monoxide, was only 82%.

EXAMPLE 2

750 ml aqueous solution of hydroxylamine sulphate, with the following composition: 40 g free sulphuric acid/l, 64 g hydroxylamine/l and 7.5 g ammonia/l, were passed through a strongly acidic cation exchange column. The strongly acidic cationite I produced by Merck (Darmstadt) was used. The hydroxylamine and the ammonia were retained quantitatively.

Subsequent elution was carried out with sulphuric acid to obtain 755 ml eluate with the following composition: 45.2 g free sulphuric acid/l; 62.6 g hydroxylamine/l; 7.1 g ammonia/l. The eluate obtained is appropriate for oximation.

The application of the process, according to the invention, offers numerous advantages. For example hydroxylamine is produced with increased productivity and yield; increased service life of the catalyst is obtained, the catalyst being more active and less selective; the possibility is created of using an impure mineral acid; the consumption of sulphuric acid and ammonia is practically totally eliminated, while hydrogen consumption is significantly reduced; the production of ammonium sulphate as a by-product is eliminated; and ammonia consumption in oximation is reduced, as against the noncatalytic hydroxylamine synthesis processes.

I claim:

1. A process for the production of cyclohexanone oxime comprising the steps of:
    a. mixing nitrogen monoxide and hydrogen with planetary agitation in the presence of a platinum catalyst in a mineralacid medium in the form of a solution of ammonium hydrogen sulfate or phosphate to reduce said nitrogen monoxide and produce a mixture of hydroxylamine, ammonium and hydroxylammonium salts;
    b. reacting said mixture with cyclohexanone while concomitantly raising the pH value of the mixture by adding ammonia thereto to produce the cyclohexanone oxime; and
    c. separating the cyclohexanone oxime from the ammonium salt solution.

2. The process defined in claim 1 further comprising the steps of:
    concentrating said salt solution by evaporating it to dryness to produce a dry salt;
    thermally decomposing said dry salt to produce an acid ammonium salt and ammonia;
    dissolving said acid ammonium salt to produce another solution; and
    recycling said other solution for hydroxylamine production while recycling the ammonia for use in the production of the cyclohexanone oxime.

3. The process defined in claim 1 wherein the solubility of the cyclohexanoneoxime in said solution is reduced by addition of a neutral ammonium salt to the mixture of ammonium and hydroxylammonium salts.

4. The process defined in claim 1, further comprising the steps of:
    separating said catalyst from said medium;
    separating said hydroxylamine from said medium by passing said medium through an acidic cation exchange resin;
    eluting said mineral acid from the cation exchange resin while retaining said hydroxylamine on the resin;
    recycling eluted acid for use in the production of hydroxylamine;
    eluting the hydroxylamine from said resin with a less pure acid to produce a hydroxylammonium salt; and
    recycling said less pure acid used for elution.

5. The process defined in claim 4 wherein the less pure acid is acetic acid.

6. The process defined in claim 1 wherein said cyclohexanoneoxime is separated by raising the pH of said medium toward neutral.

* * * * *

UNITED STATES PATENT AND TRADEMARK OFFICE
CERTIFICATE OF CORRECTION

PATENT NO. : 3,941,840
DATED : 2 March 1976
INVENTOR(S) : Cornel-Constantin N. ROTARU and Piatra NEAMT It is certified that error appears in the above-identified patent and that said Letters Patent are hereby corrected as shown below:

In the heading, line [30]

for "ITALY" read -- ROMANIA --.

Signed and Sealed this twenty-fifth Day of May 1976

[SEAL]

Attest:

RUTH C. MASON
*Attesting Officer*

C. MARSHALL DANN
*Commissioner of Patents and Trademarks*